(12) United States Patent
Guo et al.

(10) Patent No.: US 9,640,133 B2
(45) Date of Patent: May 2, 2017

(54) POWER SUPPLY CIRCUIT AND A DISPLAY DEVICE COMPRISING THE POWER SUPPLY CIRCUIT

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Naijia Guo, Beijing (CN); Jianzi He, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/408,288

(22) PCT Filed: Jun. 13, 2014

(86) PCT No.: PCT/CN2014/079838
§ 371 (c)(1),
(2) Date: Dec. 15, 2014

(87) PCT Pub. No.: WO2015/070600
PCT Pub. Date: May 21, 2015

(65) Prior Publication Data
US 2016/0275901 A1 Sep. 22, 2016

(30) Foreign Application Priority Data
Nov. 15, 2013 (CN) .......................... 2013 1 0574876

(51) Int. Cl.
*G09G 5/00* (2006.01)
*H04N 5/63* (2006.01)
*G06F 3/14* (2006.01)

(52) U.S. Cl.
CPC ............... *G09G 5/003* (2013.01); *G06F 3/14* (2013.01); *H04N 5/63* (2013.01);
(Continued)

(58) Field of Classification Search
CPC . G06F 1/3218; H04N 5/63; H02M 2001/0032
See application file for complete search history.

(56) References Cited

U.S. PATENT DOCUMENTS

| | | | |
|---|---|---|---|
| 2008/0042967 A1* | 2/2008 | Inoue | G09G 3/3406 345/102 |
| 2010/0315845 A1* | 12/2010 | Kotani | H02M 3/33561 363/37 |
| 2012/0326502 A1 | 12/2012 | Nguyen et al. | |

FOREIGN PATENT DOCUMENTS

| | | |
|---|---|---|
| CN | 101150811 A | 3/2008 |
| CN | 101742186 | 6/2010 |

(Continued)

OTHER PUBLICATIONS

Chinese Office Action with English Language Translation, dated Mar. 3, 2016, Chinese Application No. 201310574876.2.
(Continued)

*Primary Examiner* — Gerald Johnson
(74) *Attorney, Agent, or Firm* — Blakely Sokoloff Taylor & Zafman LLP (57) ABSTRACT

The present invention provides a power supply circuit for supplying power for a display device, the display device comprising a standby module and a plurality of functional modules, the power supply circuit comprising a power supply module; a plurality of transformer modules, receiving a power voltage provided by the power supply module,
(Continued)

and converting the power voltage into working voltages provided to the plurality of functional modules; and a switch module, connected between the power supply module and the plurality of transformer modules, for controlling the power supply module to provide the power voltage to the plurality of transformer modules, wherein the power supply module supplies power to the standby module directly, and supplies power to the plurality of functional modules through the plurality of transformer modules. The standby power consumption of the power supply circuit is reduced and the structure of the circuit is simplified, thereby solving the problem of large standby power consumption and complex structure of the power supply circuit in the prior art, meanwhile reducing the production cost. The present invention further provides a display device comprising such a power supply circuit.

18 Claims, 3 Drawing Sheets

(52) U.S. Cl.
CPC ............... *G09G 2310/0289* (2013.01); *G09G 2330/021* (2013.01); *G09G 2330/022* (2013.01)

(56) References Cited

FOREIGN PATENT DOCUMENTS

| | | |
|---|---|---|
| CN | 101883205 | 11/2010 |
| CN | 102063175 A | 5/2011 |
| CN | 102256087 | 11/2011 |
| CN | 103561221 A | 2/2014 |
| CN | 203554579 | 4/2014 |
| JP | 2000-261983 A | 9/2000 |

OTHER PUBLICATIONS

International Search Report and Written Opinion with English Language Translation, dated Sep. 19, 2014, Application No. PCT/CN2014/079838.

* cited by examiner

POWER SUPPLY CIRCUIT AND A DISPLAY DEVICE COMPRISING THE POWER SUPPLY CIRCUIT

FIELD OF THE INVENTION

The present invention relates to the field of display technology, particularly to a power supply circuit for supplying power for a display device and a display device comprising such a power supply circuit.

BACKGROUND OF THE INVENTION

With the development of economy, people own more and more broad audio visual space, therefore, many consumers who have pursuit on quality of life are no longer limited to the basic level such as image quality and sound quality when purchasing TV products, "large size" matched with "large space" has also become an important factor considered by the consumers.

Especially with the development of smart TV, the television is not only used for watching TV programs, people can use it for social contact, entertainment, information searching etc., it has become the center of family life and entertainment. The large size TV has a better display effect in both viewing video programs and playing games. Especially after the 3D function has become the standard configuration of TV, it is more splendid in rendering of the 3D effect, people can enjoy the superexcellent audio visual effect of the 3D IMAX at home. The requirement of catering for consumers' increasingly attention to personal space comfort also promotes the display screen and the color TV manufacturers to extend towards the "large" direction.

Meanwhile, the power supply circuit that provides electric energy for the LCD TV mainboard system and the LCD backlight module needs to provide larger output power and current to match the large size. Thus, the power supply circuit is relatively complex, the number of different working voltages outputted is also much more than the small size, so as to ensure that the large size LCD TV can render clear and high quality images.

When designing the power supply circuit, due to the limit of the component specification, e.g., limit of factors such as maximum voltage, maximum current, two or more power supply boards are generally designed in the power supply circuit to supply power to the large size TV so as to ensure that the large size TC can work normally. In the prior art, in order to control standby and turn-on of the power supply module, each power supply board corresponds to a standby module, referring to FIG. 1. Since there are too many standby modules, the power consumption of the whole power supply circuit in the case of standby usually exceeds the national standard limit (0.5 W), such that the products cannot come into the market, which results in serious economic loss. Meanwhile, since each power supply board corresponds to a standby module, the power supply circuit becomes more complex, therefore, a larger space is required to place the power supply circuit, such that the large size TV becomes more massive, which does not conform to the development trend of thinness and lightness. In addition, the increase of the standby modules also results in increase of the production cost of the large size TV.

SUMMARY OF THE INVENTION

One aspect of the present invention provides a power supply circuit for supplying power for a display device, such that the standby power consumption of such a power supply circuit is reduced and the structure of the circuit is simplified, thereby solving the problem of large standby power consumption and complex structure of the power supply circuit in the prior art, meanwhile reducing the production cost.

According to an embodiment of the present invention, a power supply circuit is provided for supplying power to a display device. The display device comprises a standby module and a plurality of functional modules. The power supply circuit comprises: a power supply module; a plurality of transformer modules, receiving a power voltage provided by the power supply module, and converting the power voltage into working voltages provided to the plurality of functional modules; and a switch module, connected between the power supply module and the plurality of transformer modules, for controlling the power supply module to provide the power voltage to the plurality of transformer modules, wherein the power supply module supplies power to the standby module directly, and supplies power to the plurality of functional modules through the plurality of transformer modules.

According to another embodiment of the present invention, each of the plurality of transformer modules may further comprise a boosting unit and at least one transformer output unit. The boosting unit connects with the power supply module via the switch module, for boosting the received power voltage and providing the boosted power voltage to the transformer output unit The transformer output unit receives a driving voltage from the power supply module via the switch module, and converts the received boosted power voltage into working voltages, which are provided to the plurality of functional modules. One functional module only receives the working voltage provided by one transformer output unit.

According to another embodiment of the present invention, the power supply module may further comprise a main power supply board and at least one secondary power supply board as well as a drive transformer module connected in parallel. The drive transformer module is connected between the main power supply board and the standby module as well as the transformer output units of the plurality of transformer modules, for converting the power voltage provided by the main power supply board into the driving voltage, and outputting the driving voltage to the standby module and respective transformer output units.

According to another embodiment of the present invention, when the driving voltage of the standby module differs from the driving voltage of the transformer output unit, the power supply module may further comprise a first drive transformer module for providing a first driving voltage to the standby module, so as to maintain normal working of the standby module; and a second drive transformer module for providing a second driving voltage to each transformer module, so as to maintain normal working of the transformer module.

According to another embodiment of the present invention, each transformer output unit may further comprise a transformer control subunit and a transformer output subunit connected with the transformer control subunit in series. The transformer control subunit receives the driving voltage from the main power supply board via the switch module, for controlling working of the transformer output subunit connected with the transformer control subunit in series. The transformer output subunit is connected to the boosting unit and the transformer control subunit, for converting the received filtered and boosted power voltage into the working voltage.

According to another embodiment of the present invention, the switch module may further comprise: a first switch, connected between at least one secondary power supply board of the power supply module and a boosting unit of the transformer module connected with the secondary power supply board, for controlling the at least one secondary power supply board to provide the power voltage to the boosting unit of the transformer module connected with the secondary power supply board; a second switch, connected between the main power supply board of the power supply module and a boosting unit of the transformer module connected with the main power supply board, for controlling the main power supply board to provide the power voltage to the boosting unit of the transformer module connected with the main power supply board; and a third switch, connected between the drive transformer module of the power supply module and the transformer output units of the plurality of transformer modules, for controlling the main power supply board of the power supply module to provide the driving voltage to the respective transformer output units.

According to another embodiment of the present invention, the switches may be all thin film transistors or relays. Alternatively, the switches may also be thin film transistors partly, and the other part are relays. In addition, the switches may also be switch elements such as triodes, switch diodes, thyristors, etc.

According to another embodiment of the present invention, when the switches are all thin film transistors, the thin film transistors may be all N-type or P-type thin film transistors, for the convenience of the switch control module to control the thin film transistors.

According to another embodiment of the present invention, at least one of the plurality of transformer modules may further comprise a boosting filter module. The boosting filter module is connected between the boosting unit and the transformer output unit, for filtering the boosted power voltage, and providing the filtered and boosted power voltage to the transformer output unit.

According to another embodiment of the present invention, at least one of the plurality of transformer modules may further comprise a plurality of output filter modules, the output filter module being used for filtering the working voltage outputted by the transformer output unit, and providing the filtered working voltage to the functional module of the display device.

According to another embodiment of the present invention, the switch module may further comprise: a switch control module for controlling the switch module to be in ON or OFF state.

Another aspect of the present invention further provides a display device. According to an embodiment of the present invention, a display device is provided, the display device comprises a standby module and a plurality of functional modules, and comprises a power supply circuit according to the present invention.

Since in the above power supply circuit, the main power supply board supplies power to the standby module under the standby state, the secondary power supply board does not supply power under the standby state, the standby power consumption of the whole circuit is reduced. Meanwhile, the secondary power supply board does not need to supply power under the standby state, hence, it is unnecessary to arrange in the circuit a standby module that is powered by the secondary power supply board, thereby simplifying the structure of the power supply circuit and reducing the production cost of the power supply circuit.

Since a switch module is arranged between the power supply module and the transformer modules, the switch module can control the secondary power supply board in the power supply module to provide the power voltage to the transformer module connected with the secondary power supply board, thereby reducing the standby power consumption of the whole circuit. Moreover, in the case of standby, the switch module is turned off, the secondary power supply board will no longer provide the power voltage to the transformer module connected with the secondary power supply board. Since there is no voltage on points connected with the transformer modules, it is also impossible to generate leakage currents in the transformer modules, thereby preventing generation of leakage currents in the transformer modules effectively, and further reducing the standby power consumption of the power supply circuit.

DETAILED DESCRIPTION OF THE INVENTION

The embodiments of the present invention provide a power supply circuit for supplying power for a display device and a display device comprising such a power supply circuit, such that the standby power consumption of such a power supply circuit is reduced and the structure of the circuit is simplified, thereby solving the problem of large standby power consumption and complex structure of the power supply circuit in the prior art, meanwhile reducing the production cost.

Next, the technical solutions in the embodiments of the present invention will be described clearly and completely in combination with the drawings. Apparently, the embodiments described are only part of, rather than all the embodiments of the present invention. Based on the embodiments in the present invention, all of the other embodiments obtained by the ordinary skilled person in the art without paying any creative work belong to the protection scope of the present invention.

Figure 2:
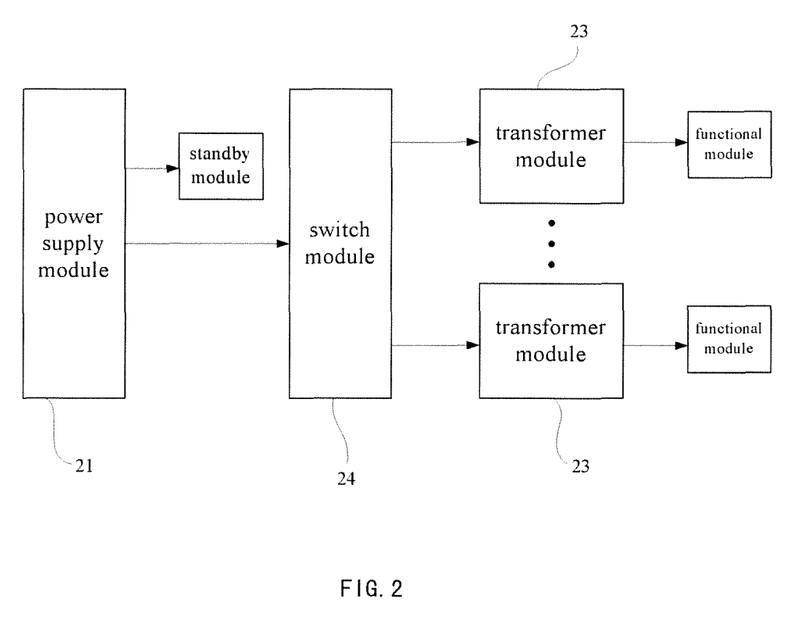
FIG. 2 is a structural block diagram of a power supply circuit according to an embodiment of the present invention.

The embodiment of the present invention provides a power supply circuit for supplying power to a display device, the display device comprising a standby module and a plurality of functional modules. Referring to FIG. 2, FIG. 2 is a structural block diagram of a power supply circuit provided by the embodiment of the present invention. From FIG. 2 it can be seen that the power supply circuit comprises: a power supply module 21; a plurality of transformer modules 23, receiving a power voltage provided by the power supply module, and converting the power voltage into working voltages provided to the plurality of functional modules; and a switch module 24, connected between the power supply module and the plurality of transformer modules, for controlling the power supply module to provide the power voltage to the plurality of transformer modules. The power supply module 21 supplies power to the standby module directly, and supplies power to the plurality of functional modules through the plurality of transformer modules.

Figure 3:
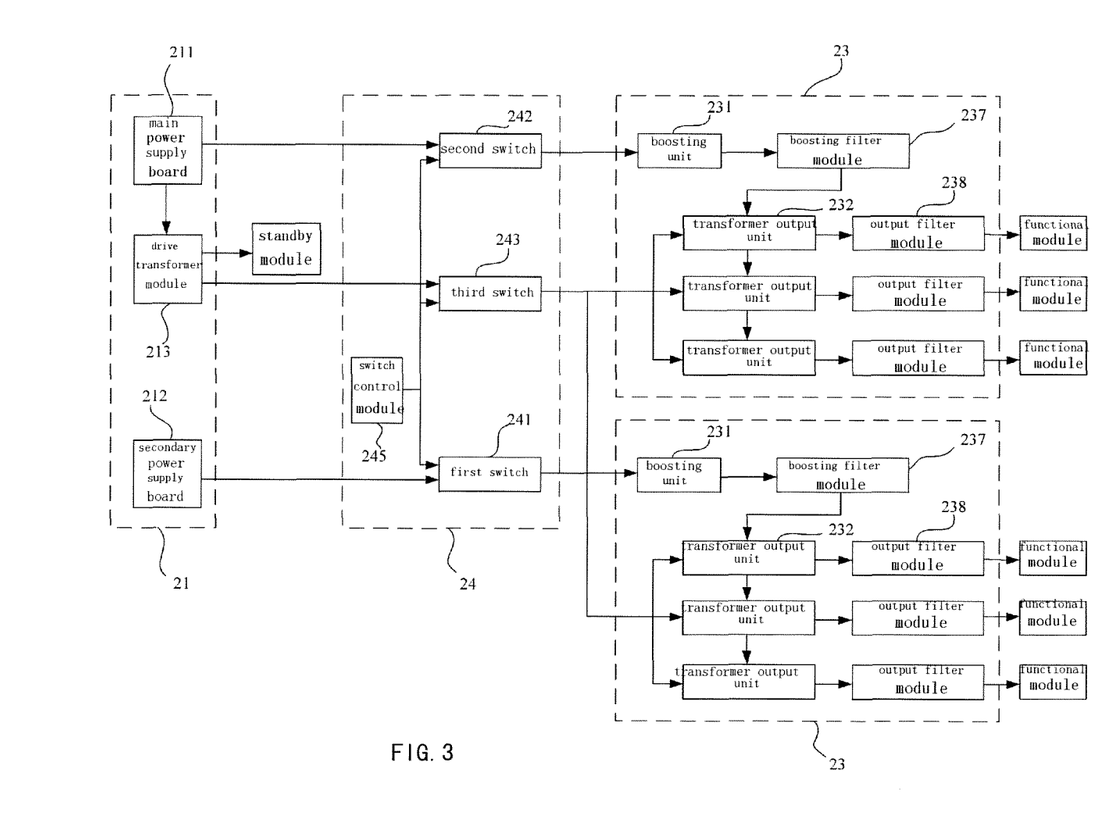
FIG. 3 is a schematic block diagram that describes the structural block diagram of the power supply circuit of FIG. 2 in detail.

FIG. 3 is a schematic block diagram that describes the structural block diagram of the power supply circuit of FIG. 2 in detail.

In FIG. 3, the power supply module 21 comprises a main power supply board 211, at least one secondary power supply board 212 and a drive transformer module 213. The main power supply board 211 and the secondary power supply board 212 are connected in parallel. The main power supply board 211 is used for providing the power voltage to the transformer module 23 connected with the main power supply board 211 through the switch module 24. The transformer module 23 converts the received power voltage into working voltages and provides them to the functional modules of the display device. The secondary power supply board 212 is used for providing the power voltage to the transformer module 23 connected with the secondary power supply board 212 through the switch module 24 The transformer module 23 converts the received power voltage into working voltages and provides them to the functional modules of the display device. The drive transformer module 213 is connected to the main power supply board 211 for converting the power voltage provided by the main power supply board 211 into a driving voltage and outputting it directly to the standby module and providing the driving voltage to the transformer module 23 through the switch module 24. Generally speaking, the drive transformer module 213 converts the power voltage into a driving voltage of 5v and provides the driving voltage to the standby module and the transformer modules.

Each voltage module 23 is connected with the main power supply board 211, or is connected with one secondary power supply board 212, and at least one transformer module 23 is connected with one secondary power supply board 212.

A switch control module 245 is used for controlling switches in the switch module 24 to be in ON or OFF state.

The switch module 24 is connected between at least one secondary power supply board 212 and the transformer module 23 connected with the secondary power supply board 212, for controlling the secondary power supply board 212 to provide the power voltage to the transformer module 23, so that it is unnecessary to arrange a standby module powered by the secondary power supply board 212, thereby reducing the standby power consumption of the whole circuit.

Further, the switch module 24 is also connected between the main power supply board 211 and the transformer module 23 connected with the main power supply board 211, for controlling the main power supply board 211 to provide the power voltage to the transformer module 23 connected with the main power supply board 211. When the power supply circuit is in a standby state, the switch module 24 is turned off, the main power supply board 211 will no longer provide the power voltage to the transformer module 23 connected with the main power supply board. Since there is no voltage on points connected with the transformer modules, it is also impossible to generate leakage currents in the transformer modules, thereby preventing generation of leakage currents in the transformer modules effectively, and further reducing the standby power consumption of the power supply circuit.

From FIG. 3 it can be seen that each of the transformer modules 23 comprises a boosting unit 231 and at least one transformer output unit 232. In each transformer module 23, the boosting unit 231 connects with the power supply module 21 via the switch module 24, for boosting the received power voltage and providing the boosted power voltage to the transformer output units 232. The transformer output units 232 receive the driving voltage from the main power supply board 211 through the switch module 24, and convert the received boosted power voltage into working voltages, and provide them to the functional modules of the display device.

In general, in each transformer module 23, the boosting unit 231 is used for boosting the received power voltage and providing the boosted power voltage to the transformer output units 232. Further, the transformer output units 232 convert the received boosted power voltage into working voltages and provide them to the functional modules of the display device, so as to maintain normal working of the functional modules.

From FIG. 3 it can also be seen that the switch module 24 may comprise a first switch 241, a second switch 242, a third switch 243 and a switch control module 245. The switch control module 245 is used for controlling the first switch 241, the second switch 242 and the third switch 243 to be in ON or OFF state.

The first switch 241 is connected between the secondary power supply board 212 and the boosting unit 231 connected with the secondary power supply board 212, for controlling the secondary power supply board 212 to provide the power voltage to the boosting unit 231 connected with the secondary power supply board 212.

The second switch 242 is connected between the main power supply board 211 and the boosting unit 231 connected with the main power supply board 211, for controlling the main power supply board 211 to provide the power voltage to the boosting unit 231 connected with the main power supply board 211.

The third switch 243 is connected between the main power supply board 211 and the transformer output unit 232 connected with the main power supply board 211, for controlling the main power supply board 211 to provide the driving voltage to the transformer output unit 232 connected with the main power supply board 211.

Further, the above switches are all thin film transistors or relays, for controlling the power supply module 21 to supply power to the functional modules of the display device through the transformer module 23. Alternatively, the switches may also be thin film transistors partly, and the other part are relays. In addition, the switches may also be switch elements such as triodes, switch diodes, thyristors, etc.

When the switches are all thin film transistors, the thin film transistors are all N-type or P-type thin film transistors, for the convenience of the switch control module 245 to control the thin film transistors.

For example, the switches are all N-type thin film transistors, the N-type thin film transistors are all turned on at high level and cut off at low level.

When the user turns off a display device through a remote controller, the remote controller issues a standby instruction to the switch control module 245. The switch control module 245 generates a low level signal based on the received standby instruction, and provides it to each of the thin film transistors, such that each of the thin film transistors is cut off. Since the power voltage cannot be transmitted to the transformer module, it is impossible for the boosting unit in the transformer module to generate a leakage current, thereby preventing generation of a leakage current in the transformer module effectively, and further reducing the standby power consumption of the power supply circuit. Meanwhile, the switch control module 245 only needs to output two kinds of signals, which simplifies the design of the switch control module 245.

Further, when the driving voltage of the standby module differs from the driving voltage of the transformer output unit 232, the drive transformer module may further comprises a first drive transformer module for providing a first driving voltage to the standby module, so as to maintain normal working of the standby module; and a second drive transformer module for providing a second driving voltage to each transformer module 232, so as to maintain normal working of the transformer module 232.

Further, the transformer module 23 further comprises a boosting filter module 237. The boosting filter module 237 is connected between the boosting unit 231 and the transformer output units 232 that receive the boosted power voltage provided by the boosting unit 231, for filtering the boosted power voltage so as to reduce noise interference in the circuit, and providing the filtered and boosted power voltage to the transformer output units 232, thereby enabling the transformer output units 232 to convert the filter and boosted power voltage into the working voltages, and provide them to the functional modules of the display device, so as to maintain normal working of the functional modules.

Further, the transformer module 23 further comprises at least one output filter module 238. The output filter module 238 is connected between the transformer output unit 232 and the functional module that receives the working voltage provided by the transformer output unit 232, for filtering the working voltage outputted by the transformer output unit 232, so as to reduce noise interference in the circuit, and providing the filtered working voltage to the functional module of the display device, so as to maintain normal working of the functional module.

Figure 4:
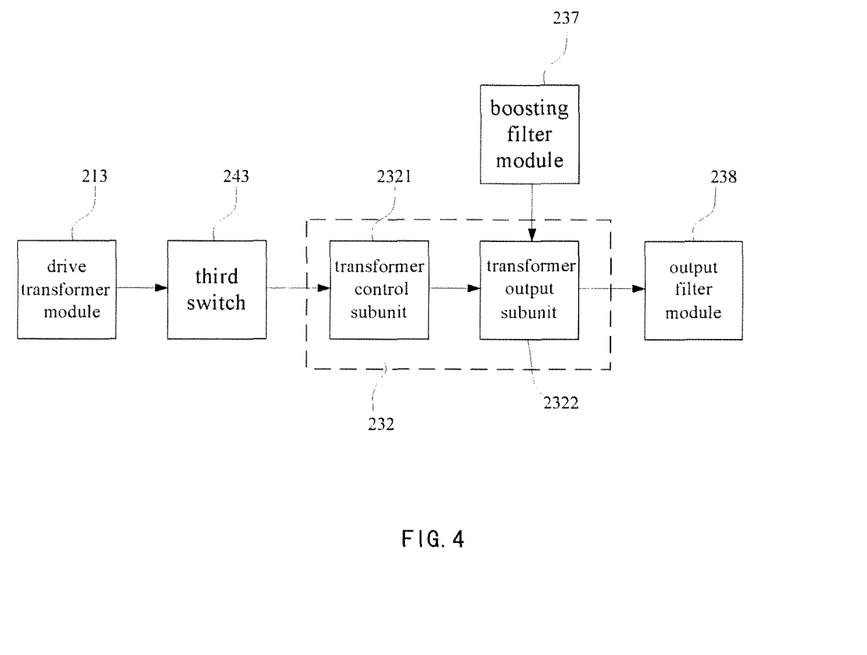
FIG. 4 is a structural schematic view of a transformer output unit.

Further, referring to FIG. 4, each of the transformer output units 232 comprises a transformer control subunit 2321 and a transformer output subunit 2322 connected with the transformer control subunit in series.

The transformer control subunit 2321 is connected with the third switch 243, and receives the driving voltage from the drive transformer module 213, for controlling the working of the transformer output subunit 2322 connected with the transformer control subunit 2321 in series.

The transformer output subunit 2322 connects the boosting filter module 237 and the transformer control subunit 2321, for converting the received filter and boosted power voltage into a working voltage, and providing it to the output filter module connected with the transformer output subunit 2322.

In the above power supply circuit, a switch module is arranged between the power supply module and the transformer module, for controlling the secondary power supply board to provide the power voltage to the transformer module connected with the secondary power supply board, and controlling the main power supply board to provide the power voltage to the transformer module connected with the main power supply board and to provide the driving voltage to the transformer output unit connected with the main power supply board, so that it is unnecessary to arrange a standby module powered by the secondary power supply board, thereby reducing the standby power consumption of the whole circuit. Moreover, when the switch module is turned off, the transformer module will not generate a leakage current, which further reduces the standby power consumption of the power supply circuit. Meanwhile, since it is unnecessary to arrange a standby module powered by the secondary power supply board, the structure of the power supply circuit is simplified, and the production cost of the power supply circuit is reduced.

An embodiment of the present invention further provides a display device. The display device comprises a standby module and a plurality of functional modules as well as a power supply circuit according to the present invention.

To sum up, the embodiments of the present invention provide a power supply circuit for supplying power to a display device and a display device comprising such a power supply circuit. In the above power supply circuit, since a switch module is arranged between the power supply module and the transformer module, the switch module can control the secondary power supply board in the power supply module to provide the power voltage to the transformer module connected with the secondary power supply board, and control the main power supply board in the power supply module to provide the power voltage to the transformer module connected with the main power supply board and to provide the driving voltage to the transformer output unit connected with the main power supply board. Therefore, it will be unnecessary to arrange in the circuit a standby module powered by the secondary power supply board, thereby reducing the standby power consumption of the whole circuit. Moreover, in the case of standby, the switch module is turned off. Since there is no voltage on points connected with the transformer modules, it is also impossible to generate leakage currents in the transformer modules, thereby preventing generation of leakage currents in the transformer modules effectively, and further reducing the standby power consumption of the power supply circuit. Meanwhile, since it is unnecessary to arrange a standby module powered by the secondary power supply board, the structure of the power supply circuit is simplified, and the production cost of the power supply circuit is reduced.

Apparently, the skilled person in the art can make various modifications and variants to the embodiments of this disclosure without departing from the spirit and scope of this disclosure. In this way, provided that these modifications and variants belong to the scope of the claims of this disclosure and the equivalent technology thereof, this disclosure also intends to cover these modifications and variants.

DRAWINGS OF THE DESCRIPTION

Figure 1:
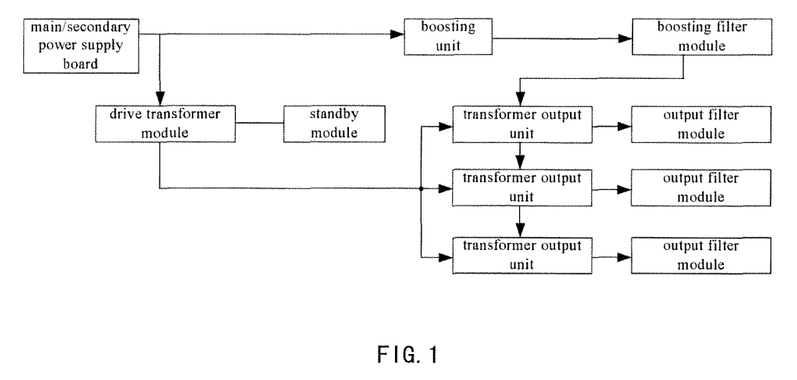
FIG. 1 is a structural schematic view of a power supply circuit in the prior art.

FIG. 1
Main/secondary power supply board, boosting unit, boosting filter module
Drive transformer module, standby module
Transformer output unit, output filter module
FIG. 2
21: power supply module
Standby module
24: switch module
23: transformer module
Functional module
FIG. 3
211: main power supply board
213: drive transformer module
212: secondary power supply board
Standby module
245: switch control module
242: second switch
243: third switch
241: first switch 231: boosting unit
237: boosting filter module
232: transformer output unit
238: output filter module
Functional module
FIG. 4
213: drive transformer module
243: third switch
2321: transformer control subunit
237: boosting filter module
2322: transformer output subunit
238: output filter module

The invention claimed is:

1. A power supply circuit for supplying power to a display device, the display device comprising a standby module and a plurality of functional modules, the power supply circuit comprising:
a power supply module;
a plurality of transformer modules, receiving a power voltage provided by the power supply module, and converting the power voltage into working voltages provided to the plurality of functional modules; and
a switch module, connected between the power supply module and the plurality of transformer modules, for controlling the power supply module to provide the power voltage to the plurality of transformer modules,
wherein the power supply module supplies power to the standby module directly, and supplies power to the plurality of functional modules through the plurality of transformer modules, and wherein each of the plurality of transformer modules comprises a boosting unit and at least one transformer output unit; wherein:
the boosting unit connects with the power supply module via the switch module, for boosting the received power voltage and providing the boosted power voltage to each of the at least one the transformer output units;
the transformer output unit receives a driving voltage from the power supply module via the switch module, and converts the received boosted power voltage into the working voltages, which are provided to the plurality of functional modules, and one functional module only receives the working voltage provided by one of the at least one transformer output units.

2. The power supply circuit as claimed in claim 1, wherein the power supply module comprises a main power supply board and at least one secondary power supply board as well as a drive transformer module connected in parallel, the drive transformer module is connected between the main power supply board and the standby module as well as the transformer output units of the plurality of transformer modules, for converting the power voltage provided by the main power supply board into the driving voltage, and outputting the driving voltage to the standby module and respective transformer output units.

3. The power supply circuit as claimed in claim 2, wherein the power supply module comprises a first drive transformer module for providing a first driving voltage to the standby module; and a second drive transformer module for providing a second driving voltage to each transformer module.

4. The power supply circuit as claimed in claim 2, wherein each transformer output unit comprises a transformer control subunit and a transformer output subunit connected with the transformer control subunit in series; wherein,
the transformer control subunit receives the driving voltage from the main power supply board via the switch module, for controlling working of the transformer output subunit connected with the transformer control subunit in series;
the transformer output subunit is connected to the boosting unit and the transformer control subunit, for converting the received filtered and boosted power voltage into the working voltage.

5. The power supply circuit as claimed in claim 2, wherein the switch module comprises:
a first switch, connected between at least one secondary power supply board of the power supply module and a boosting unit of the transformer module connected with the secondary power supply board, for controlling the at least one secondary power supply board to provide the power voltage to the boosting unit of the transformer module connected with the secondary power supply board;
a second switch, connected between the main power supply board of the power supply module and a boosting unit of the transformer module connected with the main power supply board, for controlling the main power supply board to provide the power voltage to the boosting unit of the transformer module connected with the main power supply board;
a third switch, connected between the drive transformer module of the power supply module and the transformer output units of the plurality of transformer modules, for controlling the main power supply board of the power supply module to provide the driving voltage to the respective transformer output units.

6. The power supply circuit as claimed in claim 5, wherein the switches are all thin film transistors or relays.

7. The power supply circuit as claimed in claim 6, wherein when the switches are all thin film transistors, the thin film transistors are all N-type or P-type thin film transistors.

8. The power supply circuit as claim in claim 1, wherein at least one of the plurality of transformer modules further comprises a boosting filter module, the boosting filter module is connected between the boosting unit and the transformer output unit, for filtering the boosted power voltage, and providing the filtered and boosted power voltage to the transformer output unit.

9. The power supply circuit as claimed in claim 1, wherein at least one of the plurality of transformer modules comprises a plurality of output filter modules, the output filter module being used for filtering the working voltage outputted by the transformer output unit, and providing the filtered working voltage to the functional module of the display device.

10. The power supply circuit as claimed in claim 1, wherein the switch module further comprises:
a switch control module for controlling the switch module to be in ON or OFF state.

11. A display device, comprising a standby module and a plurality of functional modules, and comprising a power supply circuit for supplying power to the display device,
wherein the power supply circuit comprises:
a power supply module;
a plurality of transformer modules, receiving a power voltage provided by the power supply module, and converting the power voltage into working voltages provided to the plurality of functional modules; and
a switch module, connected between the power supply module and the plurality of transformer modules, for controlling the power supply module to provide the power voltage to the plurality of transformer modules, wherein the power supply module supplies power to the standby module directly, and supplies power to the plurality of functional modules through the plurality of transformer modules, and wherein each of the plurality of transformer modules comprises a boosting unit and at least one transformer output unit; wherein:

the boosting unit connects with the power supply module via the switch module, for boosting the received power voltage and providing the boosted power voltage to each of the at least one transformer output units;

the transformer output unit receives a driving voltage from the power supply module via the switch module, and converts the received boosted power voltage into the working voltages, which are provided to the plurality of functional modules, and one functional module only receives the working voltage provided by one of the at least one transformer output units.

12. The display device as claimed in claim 11, wherein the power supply module comprises a main power supply board and at least one secondary power supply board as well as a drive transformer module connected in parallel, the drive transformer module is connected between the main power supply board and the standby module as well as the transformer output units of the plurality of transformer modules, for converting the power voltage provided by the main power supply board into the driving voltage, and outputting the driving voltage to the standby module and respective transformer output units.

13. The display device as claimed in claim 12, wherein the power supply module comprises a first drive transformer module for providing a first driving voltage to the standby module; and a second drive transformer module for providing a second driving voltage to each transformer module.

14. The display device as claimed in claim 12, wherein each transformer output unit comprises a transformer control subunit and a transformer output subunit connected with the transformer control subunit in series; wherein, the transformer control subunit receives the driving voltage from the main power supply board via the switch module, for controlling working of the transformer output subunit connected with the transformer control subunit in series;

the transformer output subunit is connected to the boosting unit and the transformer control subunit, for converting the received filtered and boosted power voltage into the working voltage.

15. The display device as claimed in claim 12, wherein the switch module comprises:

a first switch, connected between at least one secondary power supply board of the power supply module and a boosting unit of the transformer module connected with the secondary power supply board, for controlling the at least one secondary power supply board to provide the power voltage to the boosting unit of the transformer module connected with the secondary power supply board;

a second switch, connected between the main power supply board of the power supply module and a boosting unit of the transformer module connected with the main power supply board, for controlling the main power supply board to provide the power voltage to the boosting unit of the transformer module connected with the main power supply board;

a third switch, connected between the drive transformer module of the power supply module and the transformer output units of the plurality of transformer modules, for controlling the main power supply board of the power supply module to provide the driving voltage to the respective transformer output units.

16. The display device as claim in claim 11, wherein at least one of the plurality of transformer modules further comprises a boosting filter module, the boosting filter module is connected between the boosting unit and the transformer output unit, for filtering the boosted power voltage, and providing the filtered and boosted power voltage to the transformer output unit.

17. The display device as claimed in claim 11, wherein at least one of the plurality of transformer modules comprises a plurality of output filter modules, the output filter module being used for filtering the working voltage outputted by the transformer output unit, and providing the filtered working voltage to the functional module of the display device.

18. The display device as claimed in claim 15, wherein the switches are all thin film transistors or relays.

* * * * *